United States Patent
Li et al.

(10) Patent No.: US 8,179,998 B2
(45) Date of Patent: May 15, 2012

(54) COMMUNICATION SIGNAL RECEIVER FOR ESTIMATING AN IMAGINARY-PART COMPONENT OF A COMPLEX DATA SIGNAL AND METHOD THEREOF

(75) Inventors: Yi-Lin Li, Kao-Hsiung (TW); Cheng-Yi Huang, I-Lan Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 282 days.

(21) Appl. No.: 12/604,372

(22) Filed: Oct. 22, 2009

(65) Prior Publication Data
US 2010/0104051 A1   Apr. 29, 2010

(30) Foreign Application Priority Data
Oct. 27, 2008 (TW) ................................ 97141160 A

(51) Int. Cl.
*H04L 27/06* (2006.01)
(52) U.S. Cl. ........................ 375/326; 375/229; 375/321
(58) Field of Classification Search .................. 375/321, 375/326, 327, 229, 230, 232, 233, 350, 270; 455/204
See application file for complete search history.

(56) References Cited

U.S. PATENT DOCUMENTS

| | | | | |
|---|---|---|---|---|
| 5,406,587 A * | 4/1995 | Horwitz et al. | ............... | 375/346 |
| 5,796,786 A * | 8/1998 | Lee | ............... | 375/326 |
| 5,933,460 A * | 8/1999 | Lee | ............... | 375/324 |
| 6,084,642 A * | 7/2000 | Krishnamurthy | ............ | 348/725 |
| 6,535,553 B1 * | 3/2003 | Limberg et al. | ............... | 375/232 |
| 7,024,447 B2 * | 4/2006 | Pisati et al. | ................... | 708/819 |
| 2004/0085096 A1* | 5/2004 | Ward et al. | ........................ | 327/2 |
| 2004/0114701 A1* | 6/2004 | Markman | ..................... | 375/371 |

* cited by examiner

*Primary Examiner* — Aristocratis Fotakis
(74) *Attorney, Agent, or Firm* — Winston Hsu; Scott Margo

(57) ABSTRACT

A communication signal receiver includes a feed-forward filter and a coefficient adjusting circuit. The feed-forward filter generates an estimated imaginary-part component signal according to a real-part component of a complex data signal by using tap coefficients of the feed-forward filter. The coefficient adjusting circuit adjusts the tap coefficients of the feed-forward filter according to a control information, wherein the control information comprises a phase error information. The phase error information changes as a phase of the complex data signal changes, wherein the phase is adjusted or not adjusted by the coefficient adjusting circuit.

17 Claims, 4 Drawing Sheets

COMMUNICATION SIGNAL RECEIVER FOR ESTIMATING AN IMAGINARY-PART COMPONENT OF A COMPLEX DATA SIGNAL AND METHOD THEREOF

BACKGROUND OF THE INVENTION

1. Field of the Invention

The present invention relates to a communication signal receiver for estimating an imaginary-part component of a complex data signal and a related method, and more particularly, to an apparatus and a related method for adjusting tap coefficients of a feed-forward filter to improve an estimated result of the imaginary-part component at least according to phase error information.

2. Description of the Prior Art

In communication systems, inter-symbol interference (ISI) is a common phenomenon. The primary cause of ISI is multipath propagation. Hence, an equalizer is typically adopted in signal receivers for reducing the effect resulted from multipath propagation during signal transmission.

When processing a complex signal (such as a VSB signal) by using the equalizer, the optimum situation is to respectively process the real-part component and the imaginary-part component of the complex signal by adopting their own equalizers. However, the process is too complicated since the equalizer has too many parameters and tap numbers. A current common approach is to perform a Hilbert transform upon the real-part component of the complex signal to obtain the estimated value of the imaginary-part component, so as to replace the originally required equalizer of the imaginary-part component. Since the Hilbert transform used in the VSB signal is not an ideal Hilbert transform in a conventional signal processing, this approach seems not good enough when the phase error is slightly larger.

SUMMARY OF THE INVENTION

It is therefore one of the objectives of the claimed invention to provide a communication signal receiver for estimating an imaginary-part component of a complex data signal and a related method for solving the above-mentioned problems.

According to one aspect of the present invention, a communication signal receiver for estimating an imaginary-part component of a complex data signal is provided. The communication signal receiver comprises a first feed-forward filter and a first coefficient adjusting circuit. The feed-forward filter generates an estimated imaginary-part component signal according to a real-part component of the complex data signal by using tap coefficients of the feed-forward filter. The first coefficient adjusting circuit is coupled to the feed-forward filter and adjusts the tap coefficients of the feed-forward filter according to a control information, wherein the control information at least comprises a phase error information. The phase error information changes as a phase of the complex data signal adjusted or not adjusted by the first coefficient adjusting circuit changes.

According to another aspect of the present invention, a method for estimating an imaginary-part component of a complex data signal is provided. The method includes the steps of generating an estimated imaginary-part component signal according to a real-part component of the complex data signal together with a group of feed-forward filtering tap coefficients; and adjusting the group of feed-forward filtering tap coefficients according to a control information, wherein the control information at least comprises a phase error information. The phase error information changes as a phase of the complex data signal adjusted or not adjusted by a coefficient adjusting circuit changes. The complex data signal may be a vestigial sideband (VSB) signal.

According to another aspect of the present invention, a communication signal receiver for estimating an imaginary-part component of a complex data signal is provided. The communication signal receiver comprises a feed-forward filter, a feed-back filter, and an operator. The feed-forward filter receives a real-part component of the complex data signal and generates an estimated imaginary-part component signal according to the real-part component of the complex data signal by using tap coefficients of the feed-forward filter. The feed-back filter receives a designated signal and generates a filtered designated signal according to the designated signal by using tap coefficients of the feed-back filter. The operator is coupled to the feed-forward filter and the feed-back filter, and adjusts the estimated imaginary-part component signal according to the filtered designated signal. Both the tap coefficients of the feed-forward filter and the tap coefficients of the feed-back filter are a predetermined value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
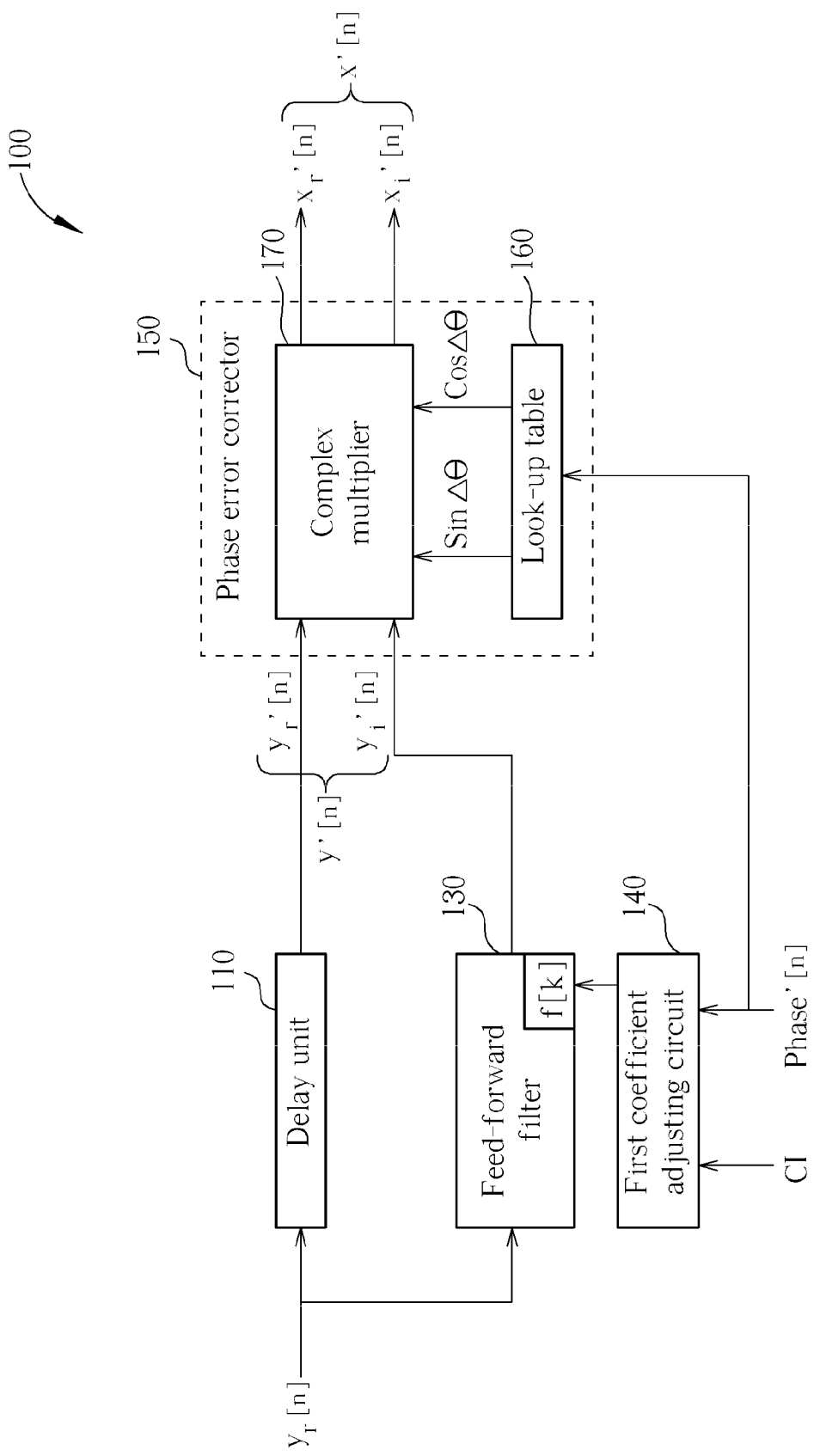
FIG. 1 is a diagram of a communication signal receiver for estimating an imaginary-part component of a complex data signal according to a first embodiment of the present invention.

Please refer to FIG. 1. FIG. 1 is a diagram of a communication signal receiver 100 for estimating an imaginary-part component of a complex data signal according to a first embodiment of the present invention. The communication signal receiver 100 includes, but is not limited to, a delay unit 110, a feed-forward filter 130, a first coefficient adjusting circuit 140, and a phase error corrector 150. The delay unit 110 delays a real-part component signal $y_r[n]$ of a complex data signal to generate a delayed real-part component signal $y_r'[n]$. The first coefficient adjusting circuit 140 is coupled to the feed-forward filter 130, wherein the first coefficient adjusting circuit 140 receives at least a phase error information Phase'[n] and adjusts tap coefficients f[k] of the feed-forward filter 130 according to the phase error information Phase'[n]. The phase error information Phase'[n] changes as a phase of the complex data signal changes. The phase of the complex data signal mentioned herein comprises the phase of the complex data signal adjusted or not adjusted by the first coefficient adjusting circuit 140. The feed-forward filter 130 receives the real-part component signal $y_r[n]$ and generates an estimated imaginary-part component signal $y_i'[n]$ according to the real-part component signal $y_r[n]$ by using the tap coefficients $f[k]$ of the feed-forward filter 130. The estimated imaginary-part component signal $y_i'[n]$ is an estimated value of the imaginary-part component of the complex data signal, and the delayed real-part component signal $y_r'[n]$ together with the estimated imaginary-part component signal $y_i'[n]$ constitute a first complex signal $y'[n]$. The phase error corrector 150 comprises a look-up table 160 and a complex multiplier 170. The look-up table 160 provides a sine value $\sin \Delta\theta$ and a cosine value $\cos \Delta\theta$ according to the phase error information Phase'[n]. The complex multiplier 170 is coupled to the look-up table 160, and it adjusts a complex phase corresponding to the delayed real-part component signal $y_r'[n]$ and the estimated imaginary-part component signal $y_i'[n]$ according to the sine value $\sin \Delta\theta$ as well as the cosine value $\cos \Delta\theta$ so as to generate an output real-part component signal $x_r'[n]$ as well as an output imaginary-part component signal $x_i'[n]$, wherein the output real-part component signal $x_r'[n]$ together with the output imaginary-part component signal $x_i'[n]$ constitute an output complex signal $x'[n]$.

Please note that the aforementioned complex data signal can be a vestigial sideband (VSB) signal and the communication signal receiver 100 can be a VSB signal receiver, but the present invention is not limited to this only and can be signals and related signal receivers of other types. In addition, the feed-forward filter 130 can be implemented by a Hilbert Transform circuit or its approximation, but this is not a limitation of the present invention.

Next, a brief expression of the properties of the Hilbert transform circuit is described to help understanding of the technical features disclosed in the present invention. A symbol $h[n]$ represents the Hilbert transform circuit in a time domain, and a symbol $H(f)$ represents the frequency response of the Hilbert transform circuit $h[n]$. An ideal characteristic of the Hilbert transform circuit $h[n]$ is that: after the Hilbert transforms are performed two times, it is equal to that the input signal multiplied by (−1) and can be expressed by the following equation:

$$H(f)^2 = (j)^2 = -1 \qquad (1).$$

As a result, the aforementioned estimated imaginary-part component signal $y_i'[n]$ and the first complex signal $y'[n]$ formed by the estimated imaginary-part component signal $y_i'[n]$ together with the delayed real-part component signal $y_r'[n]$ can be respectively expressed by the equations below:

$$y_i'[n] = \text{conv}(y_r'[n], h[n]) \qquad (2); \text{ and}$$

$$y'[n] = y_r'[n] + j*\text{conv}(y_r'[n], h[n]) \qquad (3).$$

In addition, due to the output complex signal $x'[n]$ formed by the output real-part component signal $x_r'[n]$ together with the output imaginary-part component signal $x_i'[n]$ being the result of rotating the first complex signal $y'[n]$ by an angle $\Delta\theta$, it can be expressed by the equation below:

$$x'[n] = y'[n] * (\cos\Delta\theta + j*\sin\Delta\theta) \qquad (4)$$
$$= x_r'[n] + j*x_i'[n].$$

Therefore, fit the first complex signal $y'[n]$ listed in the equation (3) into the equation (4), the output real-part component signal $x_r'[n]$ and the output imaginary-part component signal $x_i'[n]$ can be obtained, as follows:

$$x_r'[n] = y_r'[n]*\cos\Delta\theta - \text{conv}(y_r'[n], h[n])*\sin\Delta\theta \qquad (5); \text{ and}$$

$$x_i'[n] = y_r'[n]*\sin\Delta\theta + \text{conv}(y_r'[n], h[n])*\cos\Delta\theta \qquad (6).$$

Because of the characteristic of the Hilbert transform circuit $h[n]$, the output imaginary-part component signal $x_i'[n]$ can be restored according to the output real-part component signal $x_r'[n]$, as follows:

$$\text{conv}(x_r'[n], h[n]) = \text{conv}(y_r[n], h[n])*\cos\Delta\theta + y_r[n]*\sin\Delta\theta \qquad (7)$$
$$= x_i'[n].$$

As can be known, the estimated imaginary-part component signal $y_i'[n]$ can be generated according to the real-part component signal $y_r[n]$ by using the Hilbert transform circuit $h[n]$. Moreover, the output real-part component signal $x_r'[n]$ together with the output imaginary-part component signal $x_i'[n]$ calibrated by the phase error corrector 150 can be mutually transformed according to such characteristic of the Hilbert transform circuit $h[n]$.

As can be seen from FIG. 1, the tap coefficients $f[k]$ of the feed-forward filter 130 are adjusted according to the phase error information Phase'[n] and are not predetermined values anymore. Therefore, the estimated imaginary-part component signal $y_i'[n]$ generated by the feed-forward filter 130 is better than that generated by the conventional method. In this embodiment, the tap coefficients $f[k]$ of the feed-forward filter 130 are adjusted according to the phase error information Phase'[n], but this should not be considered as limitations of the present invention. In other embodiments, other control information CI can be simultaneously referred to adjust the tap coefficients $f[k]$ of the feed-forward filter 130, e.g. a signal quality information of the complex data signal or a channel lock status information. Those skilled in the art should appreciate that various modifications to the control information CI for adjusting the tap coefficients $f[k]$ of the feed-forward filter 130 may be made.

Figure 2:
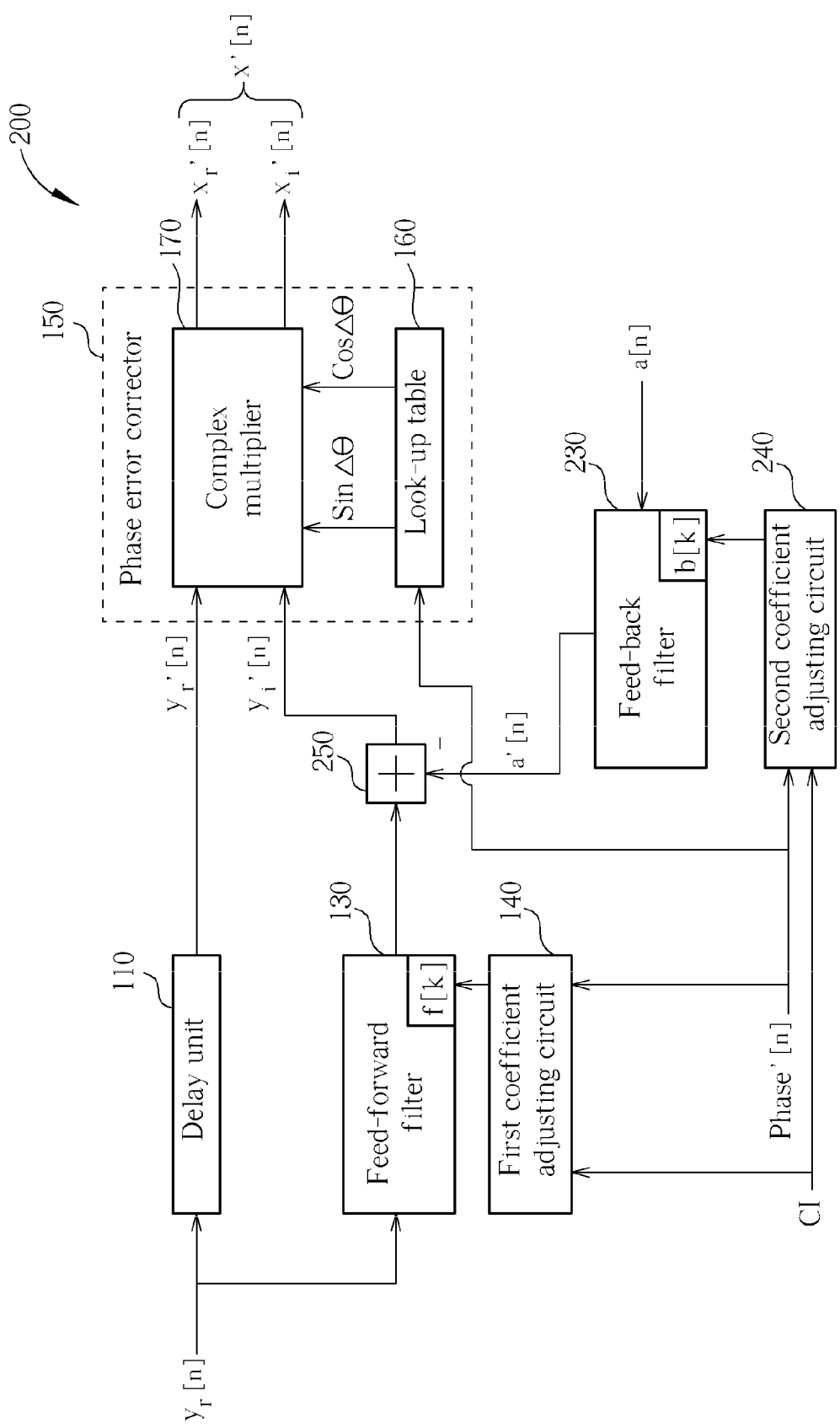
FIG. 2 is a diagram of a communication signal receiver for estimating an imaginary-part component of a complex data signal according to a second embodiment of the present invention.

Please also note that the abovementioned embodiment is presented merely as an example for illustrating the present invention, but should not be a limitation of the present invention. Please refer to FIG. 2. FIG. 2 is a diagram of a communication signal receiver 200 for estimating an imaginary-part component of a complex data signal according to a second embodiment of the present invention. The architecture of the communication signal receiver 200 shown in FIG. 2 is similar to that of the communication signal receiver 100 shown in FIG. 1, and the difference between them is that the communication signal receiver 200 further comprises a feed-back filter 230, a second coefficient adjusting circuit 240, and an operator 250. The second coefficient adjusting circuit 240 is coupled to the feed-back filter 230 for receiving the phase error information Phase'[n], and it adjusts tap coefficients $b[k]$ of the feed-back filter 230 according to the phase error information Phase'[n]. The feed-back filter 230 receives a designated signal $a[n]$ and generates a filtered designated signal $a'[n]$ according to the designated signal $a[n]$ by using the tap coefficients $b[k]$ of the feed-back filter 230. The operator 250 is coupled to the feed-forward filter 130, the feed-back filter 230, and the phase error corrector 150, and it adjusts the estimated imaginary-part component signal $y_i'[n]$ inputted to the phase error corrector 150 according to the filtered designated signal $a'[n]$. In this embodiment, the operator 250 is implemented by an adder (or a subtractor). Hence, the filtered designated signal $a'[n]$ is subtracted from the estimated imaginary-part component signal $y_i'[n]$ of the feed-forward filter 130 by the adder (or the subtractor). After the estimated imaginary-part component signal $y_i'[n]$ is processed, it is then inputted to the phase error corrector 150. In other embodiments, other elements can be adopted to implement the operator 250, and this should not be a limitation of the present invention.

As can be seen from FIG. 2, the tap coefficients b[k] of the feed-back filter 230 are adjusted according to the phase error information Phase'[n] and are not predetermined values anymore. Therefore, the performance of the finally obtained estimated imaginary-part component signal $y_i'[n]$ can be further improved. Certainly, in other embodiments, other control information CI can be simultaneously referred to adjust the tap coefficients b[k] of the feed-back filter 230, e.g. a signal quality information of the complex data signal or a channel lock status information. Moreover, in another embodiment, the tap coefficients f[k] of the feed-forward filter 130 as well as the tap coefficients b[k] of the feed-back filter 230 can be set as a predetermined value at the same time, wherein the predetermined value can be set in advance depending on experiences or by reference to other information so that the cost and complexity of circuits can be reduced. Additionally, the aforementioned designated signal a[n] can be an estimated value of a training sequence, but the present invention is not limited to this only and can be other signals.

Figure 3:
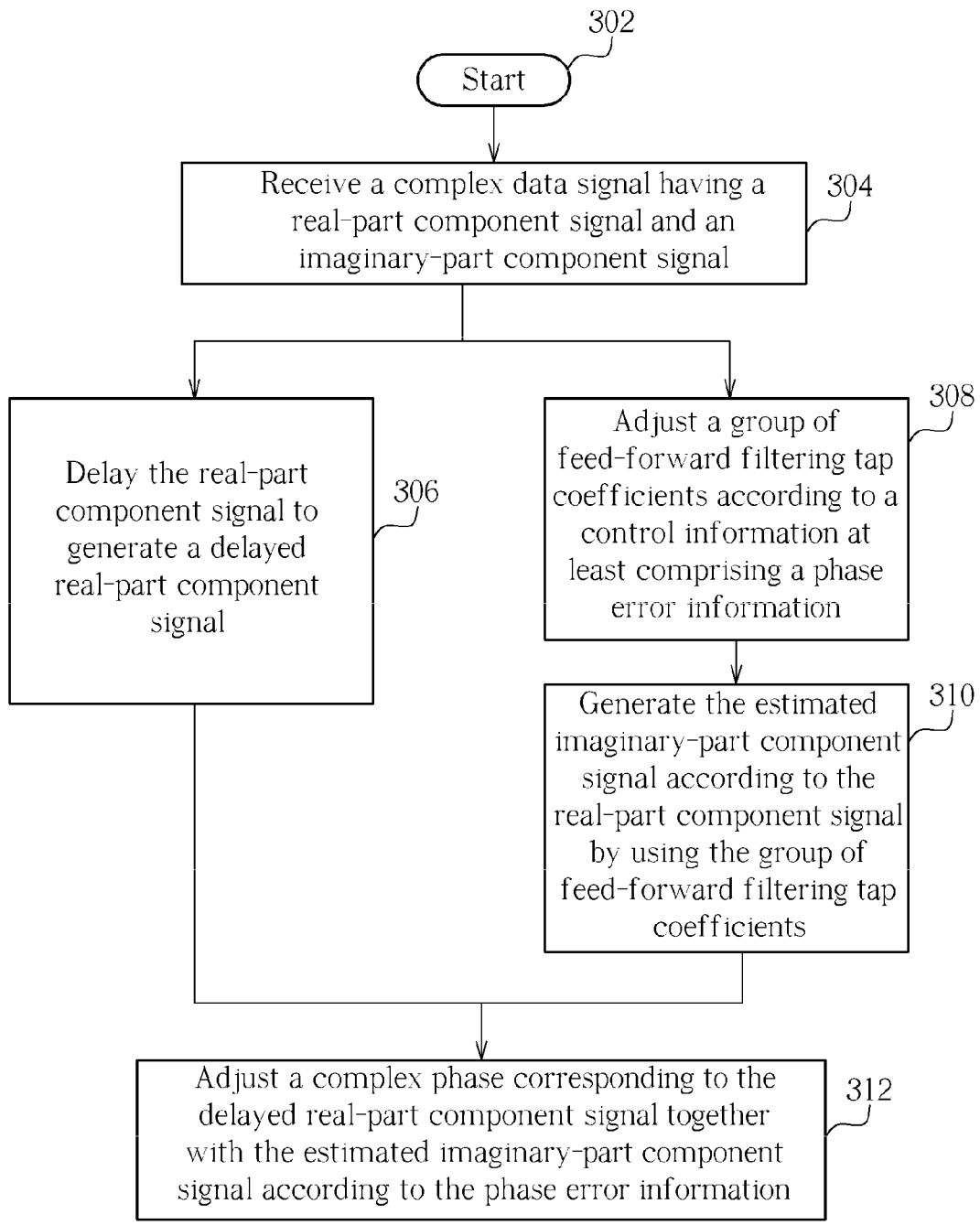
FIG. 3 is a flowchart illustrating a method for estimating an imaginary-part component of a complex data signal according to an exemplary embodiment of the present invention.

Please refer to FIG. 3. FIG. 3 is a flowchart illustrating a method for estimating an imaginary-part component of a complex data signal according to an exemplary embodiment of the present invention. Please note that the following steps are not limited to be performed according to the exact sequence shown in FIG. 3 if a roughly identical result can be obtained. The method includes, but is not limited to, the following steps:

Step 302: Start.

Step 304: Receive a complex data signal having a real-part component signal and an imaginary-part component signal.

Step 306: Delay the real-part component signal to generate a delayed real-part component signal.

Step 308: Adjust a group of feed-forward filtering tap coefficients according to a control information, wherein the control information at least comprises a phase error information.

Step 310: Generate the estimated imaginary-part component signal according to the real-part component signal by using the group of feed-forward filtering tap coefficients.

Step 312: Adjust a complex phase corresponding to the delayed real-part component signal together with the estimated imaginary-part component signal according to the phase error information.

How each element operates can be known by collocating the steps shown in FIG. 3 and the elements shown in FIG. 1. Further description of the operations of each step shown in FIG. 3 is omitted here for brevity.

Figure 4:
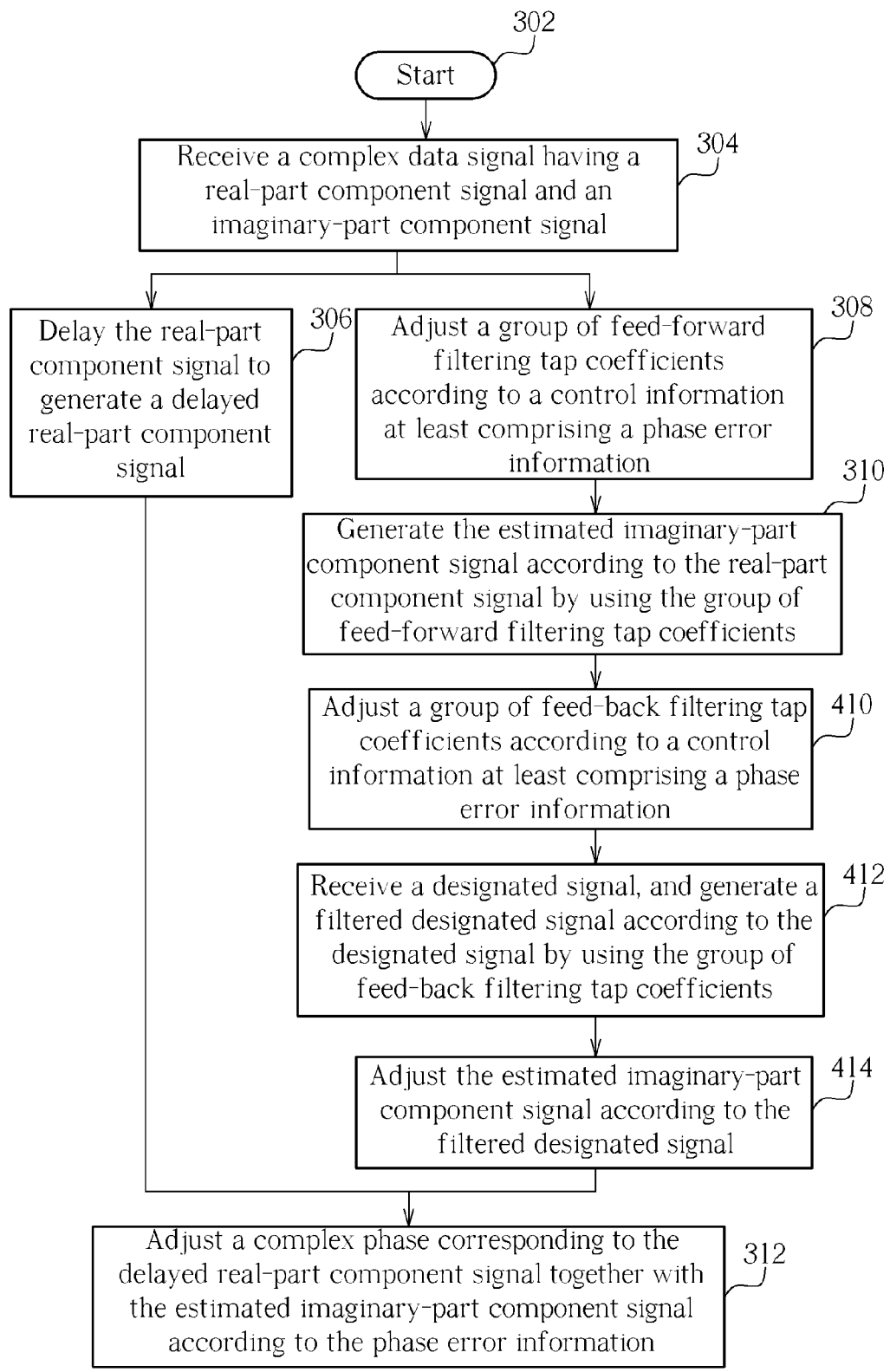
FIG. 4 is a flowchart illustrating a method for estimating an imaginary-part component of a complex data signal according to another exemplary embodiment of the present invention.

Please refer to FIG. 4. FIG. 4 is a flowchart illustrating a method for estimating an imaginary-part component of a complex data signal according to another exemplary embodiment of the present invention. The method includes, but is not limited to, the following steps:

Step 302: Start.

Step 304: Receive a complex data signal having a real-part component signal and an imaginary-part component signal.

Step 306: Delay the real-part component signal to generate a delayed real-part component signal.

Step 308: Adjust a group of feed-forward filtering tap coefficients according to a control information, wherein the control information at least comprises a phase error information.

Step 310: Generate the estimated imaginary-part component signal according to the real-part component signal by using the group of feed-forward filtering tap coefficients.

Step 410: Adjust a group of feed-back filtering tap coefficients according to a control information, wherein the control information at least comprises a phase error information.

Step 412: Receive a designated signal, and generate a filtered designated signal according to the designated signal by using the group of feed-back filtering tap coefficients.

Step 414: Adjust the estimated imaginary-part component signal according to the filtered designated signal.

Step 312: Adjust a complex phase corresponding to the delayed real-part component signal together with the estimated imaginary-part component signal according to the phase error information.

The steps shown in FIG. 4 are similar to the steps shown in FIG. 3, as FIG. 4 is a variation of the embodiment shown in FIG. 3. The difference between them is that the operations and functions of the feed-back filter (i.e., the steps 410-414) are added into the flowchart of FIG. 4, so that the performance of the finally obtained estimated imaginary-part component signal $y_i'[n]$ can be further improved. How each element operates can be known by collocating the steps shown in FIG. 4 and the elements shown in FIG. 2. Further description of the operations of each step shown in FIG. 4 is omitted here for brevity.

Be note that the steps of the flowchart mentioned above are merely a practicable embodiment of the present invention, and should not be considered as limitations of the present invention. The method can include other intermediate steps or can merge several steps into a single step without departing from the spirit of the present invention.

The abovementioned embodiments are presented merely for describing the present invention, and in no way should be considered to be limitations of the scope of the present invention. In summary, the present invention provides a communication signal receiver for estimating an imaginary-part component of a complex data signal and a related method. By making use of the phase error information Phase'[n] to adjust the tap coefficients f[k] of the feed-forward filter 130 (such as a Hilbert transform circuit), the tap coefficients f[k] are not a predetermined value anymore. Therefore, the performance of the estimated imaginary-part component signal yi'[n] of the complex data signal (such as a VSB signal) generated by the feed-forward filter 130 can be substantially improved. Especially when the phase error is very large, the imaginary-part component estimation mechanism disclosed in the present invention has a more obvious performance. Furthermore, other control information CI, e.g. a signal quality information of the complex data signal or a channel lock status information, can be simultaneously referred to adjust the tap coefficients f[k] of the feed-forward filter 130. The imaginary-part component estimation mechanism disclosed in the present invention can be extensively applied to a feed-back filter, such that the performance of the obtained estimated imaginary-part component signal $y_i'[n]$ can be further improved.

Those skilled in the art will readily observe that numerous modifications and alterations of the device and method may be made while retaining the teachings of the invention.

What is claimed is:

1. A communication signal receiver for estimating an imaginary-part component of a complex data signal, comprising:
   a feed-forward filter, for receiving a real-part component of the complex data signal and for generating an estimated imaginary-part component signal according to the real-part component of the complex data signal by using tap coefficients of the feed-forward filter;
   a first coefficient adjusting circuit, coupled to the feed-forward filter, for adjusting the tap coefficients of the feed-forward filter according to a control information, wherein the control information at least comprises a phase error information, and the phase error information changes as a phase of the complex data signal adjusted or not adjusted by the first coefficient adjusting circuit changes;

a delay unit, for delaying the real-part component of the complex data signal to generate a delayed real-part component signal; and a phase error corrector, coupled to the delay unit and the feed-forward filter, for adjusting a complex phase corresponding to the delayed real-part component signal and the estimated imaginary-part component signal according to the phase error information.

2. The communication signal receiver of claim 1, wherein the control information further comprises at least one of a signal quality information corresponding to the complex data signal and a channel lock status information.

3. The communication signal receiver of claim 1, wherein the phase error corrector comprises:
a look-up table, for providing a sine value and a cosine value according to the phase error information; and
a complex multiplier, for adjusting the complex phase corresponding to the delayed real-part component signal and the estimated imaginary-part component signal according to the sine value as well as the cosine value.

4. The communication signal receiver of claim 1, further comprising:
a feed-back filter, for receiving a designated signal and for generating a filtered designated signal according to the designated signal by using tap coefficients of the feed-back filter.

5. The communication signal receiver of claim 4, further comprising:
a second coefficient adjusting circuit, coupled to the feed-back filter, for adjusting the tap coefficients of the feed-back filter according to the control information.

6. The communication signal receiver of claim 4, wherein the tap coefficients of the feed-back filter is a predetermined value.

7. The communication signal receiver of claim 4, further comprising:
an operator, coupled to the feed-forward filter and the feed-back filter, for adjusting the estimated imaginary-part component signal according to the filtered designated signal.

8. A method for estimating an imaginary-part component of a complex data signal, comprising:
generating an estimated imaginary-part component signal according to a real-part component of the complex data signal together with a group of feed-forward filtering tap coefficients;
adjusting the group of feed-forward filtering tap coefficients according to a control information, wherein the control information at least comprises a phase error information, and the phase error information changes as a phase of the complex data signal adjusted or not adjusted by a coefficient adjusting circuit changes;
delaying the real-part component of the complex data signal to generate a delayed real-part component signal; and
adjusting a complex phase corresponding to the delayed real-part component signal and the estimated imaginary-part component signal according to the phase error information.

9. The method of claim 8, wherein the control information further comprises at least one of a signal quality information corresponding to the complex data signal and a channel lock status information.

10. The method of claim 8, wherein the step of adjusting the complex phase corresponding to the delayed real-part component signal and the estimated imaginary-part component signal according to the phase error information comprises:
providing a sine value and a cosine value according to the phase error information; and
adjusting the complex phase corresponding to the delayed real-part component signal and the estimated imaginary-part component signal according to the sine value as well as the cosine value.

11. The method of claim 8, further comprising:
generating a filtered designated signal according to a designated signal by using a group of feed-back filtering tap coefficients.

12. The method of claim 11, further comprising:
adjusting the group of feed-back filtering tap coefficients according to the control information.

13. The method of claim 11, wherein the group of feed-back filtering tap coefficients is a predetermined value.

14. The method of claim 11, further comprising:
adjusting the estimated imaginary-part component signal according to the filtered designated signal.

15. The method of claim 14, wherein the step of adjusting the estimated imaginary-part component signal according to the filtered designated signal comprises:
subtracting the filtered designated signal to generate the estimated imaginary-part component signal.

16. A communication signal receiver for estimating an imaginary-part component of a complex data signal, comprising:
a feed-forward filter, for receiving a real-part component of the complex data signal and for generating an estimated imaginary-part component signal according to the real-part component of the complex data signal by using tap coefficients of the feed-forward filter;
a feed-back filter, for receiving a designated signal and for generating a filtered designated signal according to the designated signal by using tap coefficients of the feed-back filter;
an operator, coupled to the feed-forward filter and the feed-back filter, for adjusting the estimated imaginary-part component signal to generate an operated estimated imaginary-part component signal according to the filtered designated signal;
a delay unit, for delaying the real-part component of the complex data signal to generate a delayed real-part component signal; and
a phase error corrector, coupled to the delay unit and the operator, for adjusting a complex phase corresponding to the delayed real-part component signal and the operated estimated imaginary-part component signal according to a phase error information, where the phase error information changes as a phase of the complex data signal changes;
wherein both the tap coefficients of the feed-forward filter and the tap coefficients of the feed-back filter are adjusted by the phase error information.

17. The communication signal receiver of claim 16, wherein the phase error corrector comprises:
a complex multiplier, for adjusting the complex phase corresponding to the delayed real-part component signal and the operated estimated imaginary-part component signal according to a sine value as well as a cosine value.

* * * * *